United States Patent Office 3,355,450
Patented Nov. 28, 1967

3,355,450
17-DIALKYLAMINOALKYL ETHERS OF STEROIDS
Eugene L. Woroch, Itasca, Ill., assignor to Abbott Laboratories, North Chicago, Ill., a corporation of Illinois
No Drawing. Filed Sept. 24, 1962, Ser. No. 225,887
2 Claims. (Cl. 260—239.55)

The present invention is concerned with steroid ethers; more particularly, it is concerned with dialkylaminoalkoxysteroids of the androstane and estrane series carrying in the 3-position an oxygen atom or an ethylenedioxy group.

The new steroids are expressed by the formula

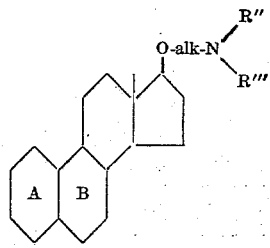

wherein alk represents an alkylene chain of 2 to 3 carbon atoms, wherein R" and R''' are each a monovalent alkyl substituent of 1 to 3 carbon atoms, and wherein the A/B rings have a configuration selected from

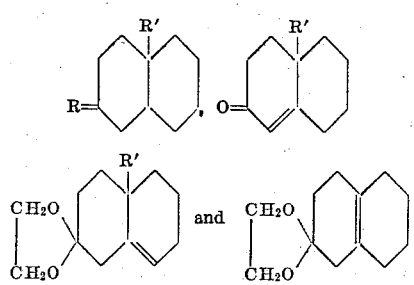

wherein R is oxygen or ethylenedioxy and wherein R' is hydrogen or methyl.

The new compounds of the present invention are active as cholesterol-lowering agents, i.e., when administered to warm-blooded animals they produce reduction in blood serum cholesterol.

The new 17-steroid ethers are prepared by a very simple process consisting essentially in refluxing a saturated or 5-unsaturated 3-ethylenedioxy-17-hydroxysteroid with an alkali metal in a water-immiscible, inert solvent to form the corresponding alkali metal salt of the said 3-ethylenedioxy-17-hydroxysteroid, and reacting the latter with an amino compound of the formula

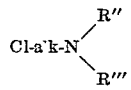

wherein R", R''' and alk have the above-identified meanings. Any excess of alkali metal is then decomposed by the addition of an alcohol such as tertiary butanol. The new 17-dialkylaminoalkoxy-3-ethylenedioxysteroid is isolated by evaporation of the solvent under reduced pressure. The 3-ethylenedioxy group can be hydrolyzed by known means to the corresponding 3-oxo group. If this hydrolysis step is carried out on a Δ⁵-steroid under acidic conditions, the double bond shifts to the 4-position.

The present invention is more clearly described by reference to the following examples which are given here as illustrations only and are not meant to limit the invention in any respect.

*Example 1.—17-diethylaminoethoxy-3-ethylenedioxy-androst-5-ene*

A three-necked flask is charged with 3.0 grams of 3-ethylenedioxyandrost-5-en-17β-ol, 300 ml. of dry, thiophene-free benzene, and 2.4 grams of potassium metal. The mixture is refluxed and stirred vigorously for 3 hours. The resulting suspension is treated with 10 grams of 2-diethylaminoethylchloride. After standing overnight at room temperature the solution is refluxed and stirred for an additional 4 hours. The excess potassium is decomposed by adding 25 ml. of tertiary butanol. The solution is washed with water, dried over magnesium sulfate, and evaporated to leave a brownish, oily solid. Sublimation of this viscous solid at 140° C. and 0.2 mm. of pressure yields a yellowish oil and a colorless solid. The colorless solid is resublimed at 95° C. and 0.2 mm. of pressure, yielding a white solid melting at 96–98° C. which analyzes 75.05% C, 10.45% H, and 3.05% N, corresponding with the calculated values for 17 - diethylaminoethoxy-3-ethylenedioxyandrost-5-ene of emperical formula $$C_{27}H_{45}O_3N$$

*Example 2.—17-Diethylaminoethoxyandrost-4-en-3-one*

By treating 17β - diethylaminoethoxy-3-ethylenedioxy-androst-5-ene of Example 1 with dilute aqueous hydrochloric acid in the presence of methanol or acetone, evaporating the mixture in vacuo, adding water to the residue, and making it alkaline by the addition of sodium bicarbonate, 17β-diethylaminoethoxyandrost-4-en-3-one is obtained, having an empirical formula of $C_{25}H_{41}O_2N$. The pure compound is isolated by extracting it with ether, washing the organic layer with water, drying it, and evaporating the ether. Its infrared absorption pattern is in agreement with the pattern expected for the compound of this configuration.

*Examples 3–8*

By following the procedure described in Example 1 but replacing 2-diethylaminoethylchloride with similar 2-dialkylaminoalkylchlorides, or -bromides, the following 17β-dialkylaminoalkoxy-3-ethylenedioxyandrost - 5 - enes are made. In this list, the term "X" is understood to express the monovalent 17-(3-ethylenedioxyandrost-5-ene) radical.

TABLE 1

| Ex. | Compound | Empirical Formula |
|---|---|---|
| 3 | 2-dimethylaminoethoxy-X | $C_{25}H_{41}O_3N$ |
| 4 | 3-dimethylaminopropoxy-X | $C_{26}H_{43}O_3N$ |
| 5 | 2-dimethylaminopropoxy-X | $C_{26}H_{43}O_3N$ |
| 6 | 2-methylethylaminoethoxy-X | $C_{26}H_{43}O_3N$ |
| 7 | 3-di-n-propylaminopropoxy-X | $C_{30}H_{51}O_3N$ |
| 8 | 2-methylpropylaminoethoxy-X | $C_{27}H_{45}O_3N$ |

Examples 9–14

In analogy to Example 1 but replacing 3-ethylenedioxyandrost-5-en-17β-ol with 3-ethylenedioxyestren-17β-ol which contains a double bond in the 5-position and using the dialkylaminoalkylhalides used for Examples 3–8, the following compounds are obtained, wherein the term "Y" is used to express the monovalent radical 17-(3-ethylenedioxyestrene):

TABLE 2

| Ex. | Compound | Empirical Formula |
|---|---|---|
| 9 | 2-dimethylaminoethoxy-Y | $C_{20}H_{39}O_3N$ |
| 10 | 3-dimethylaminopropoxy-Y | $C_{25}H_{41}O_3N$ |
| 11 | 2-dimethylaminopropoxy-Y | $C_{25}H_{41}O_3N$ |
| 12 | 2-methylethylaminoethoxy-Y | $C_{25}H_{41}O_3N$ |
| 13 | 3-di-n-propylaminopropoxy-Y | $C_{29}H_{49}O_3N$ |
| 14 | 2-methylpropylaminoethoxy-Y | $C_{26}H_{43}O_3N$ |

Since the 3-ethylenedioxyestren-17β-ol used as starting material contains a double bond that can be in the 5–6 position or in the 5–10 position, the above examples produce mixtures of these isomeric steroid ethers. The mixtures can easily be separated by known chromatographic methods.

Examples 15–20

In analogy to the procedure described in Example 2 the compounds made in Examples 3–8 are hydrolyzed under acidic conditions to produce the corresponding 17β-dialkylaminoalkoxyandrost-4-en-3-ones. The following compounds wherein X′ is used to express the radical 17β-(androst-4-en-3-one) are obtained in this manner.

TABLE 3

| Ex. | Compound | Empirical Formula |
|---|---|---|
| 15 | 2-dimethylaminoethoxy-X′ | $C_{23}H_{37}O_2N$ |
| 16 | 3-dimethylaminopropoxy-X′ | $C_{24}H_{39}O_2N$ |
| 17 | 2-dimethylaminopropoxy-X′ | $C_{24}H_{39}O_2N$ |
| 18 | 2-methylethylaminoethoxy-X′ | $C_{24}H_{39}O_2N$ |
| 19 | 3-di-n-propylaminopropoxy-X′ | $C_{28}H_{47}O_2N$ |
| 20 | 2-methylpropylaminoethoxy-X′ | $C_{25}H_{41}O_2N$ |

Examples 21–26

By following the procedure of Example 2 but using the 3-ethylenedioxyestren-17β-dialkylaminoalkoxy ethers of Examples 9–14 as starting materials for the acid hydrolysis, the following compounds are prepared, wherein the term Y′ is used to express the radical 17β-(estren-3-one):

TABLE 4

| Ex. | Compound | Empirical Formula |
|---|---|---|
| 21 | 2-dimethylaminoethoxy-Y′ | $C_{22}H_{35}O_2N$ |
| 22 | 3-dimethylaminopropoxy-Y′ | $C_{23}H_{37}O_2N$ |
| 23 | 2-dimethylaminopropoxy-Y′ | $C_{23}H_{37}O_2N$ |
| 24 | 2-methylethylaminoethoxy-Y′ | $C_{23}H_{37}O_2N$ |
| 25 | 3-di-n-propylaminopropoxy-Y′ | $C_{27}H_{45}O_2N$ |
| 26 | 2-methylpropylaminoethoxy-Y′ | $C_{24}H_{39}O_2N$ |

Whether the starting material used for the above procedure is the 5–6 unsaturated 3-ethylenedioxyestren ether or the 5–10 unsaturated 3-ethylenedioxyestren ether or a mixture of the two compounds, the double bond in the final product of Examples 21–26 is always in the 4-position.

As seen from the above examples, the new steroid ethers are prepared by first reacting a saturated or Δ⁵-unsaturated steroid-17β-ol with an alkali metal to form the corresponding salt, preferably the lithium, potassium or sodium salt. This reaction is carried out at a temperature between room temperature and about 120° C. in the presence of an inert, water-immiscible, dry, organic solvent. The term "inert" is meant to express that the solvent does not enter any reaction with either component of the reaction mixture, with the resulting steroid ether to be formed, or with the dialkylaminoalkyl chloride with which this salt is to be reacted. Among these solvents are benzene, toluene, xylenes, petroleum ether and other high-boiling hydrocarbons, etc.

The dialkylaminoalkyl chloride used in the above examples can also be replaced by similar reactants, e.g., 2-dipropylaminoethylchloride, 2-methylethylaminopropylchloride, 2-diisopropylaminoethylchloride, 2-methylpropylaminopropylchloride, etc., and, of course, in all cases the above named chlorides can be replaced by the corresponding bromides.

It is to be noted that any excess alkali metal which may still be in suspension after the reaction with the dialkylaminoalkylhalide is completed, can be destroyed by the addition of an alcohol, e.g., tertiary butyl alcohol or similar low-boiling alcohols. Isolation of the new steroid ethers can be carried out in various ways, e.g., by evaporation or by precipitation with another organic solvent in which the ether is not soluble. It is to be understood that the above 3-oxo-17-dialkylaminoalkylethers can also be obtained in the form of their salts with organic or inorganic acids.

Others may practice the invention in various ways which will be suggested to one skilled in the art by the present disclosure. All such practice of the invention is considered a part hereof provided it falls within the scope of the appended claims.

I claim:
1. The process of preparing 3-ethylenedioxy-17-dialkylaminoalkoxysteroids consisting essentially of
treating a 3-ethylenedioxy-17-hydrosteroid with an alkali metal having an atomic weight of less than 40 in the presence of a water-immiscible, inert, organic solvent,
reacting the suspension formed with a dialkylaminoalkylhalide wherein said halide is selected from the group consisting of chlorine and bromine,
destroying any excess alkali metal, and isolating the formed ether.

2. The process of claim 1 wherein said 3-ethylenedioxy-17-hydroxysteroid is the 3-ethylenedioxyandrost-5-en-17β-ol and wherein said dialkylaminoalkylhalide is diethylaminoethylchloride.

References Cited

Migrdichian "Organic Synthesis," vol. 1, 1957, Reinhold Publishing Corp., New York, N.Y., pp. 77 and 78.

LEWIS GOTTS, *Primary Examiner.*

M. LIEBMAN, I. MARCUS, *Examiners.*

J. R. BROWN, H. FRENCH, *Assistant Examiners.*